US009761953B2

(12) United States Patent
De Lustrac et al.

(10) Patent No.: US 9,761,953 B2
(45) Date of Patent: Sep. 12, 2017

(54) ELECTROMAGNETIC ABSORBER

(71) Applicants: UNIVERSITE PARIS SUD, Orsay (FR); CENTRE NATIONAL DE LA RECHERCHE SCIENTIFIQUE, Paris (FR); UNIVERSITE PARIS OUEST NANTERRE LA DEFENSE, Nanterre (FR)

(72) Inventors: André De Lustrac, Sceaux (FR); Alexandre Sellier, Buc (FR)

(73) Assignees: UNIVERSITE PARIS SUD, Orsay (FR); UNIVERSITE PARIS QUEST NANTERRE LA DEFENSE, Nanterre (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 274 days.

(21) Appl. No.: 14/429,647

(22) PCT Filed: Sep. 20, 2013

(86) PCT No.: PCT/EP2013/069544
§ 371 (c)(1),
(2) Date: Mar. 19, 2015

(87) PCT Pub. No.: WO2014/044786
PCT Pub. Date: Mar. 27, 2014

(65) Prior Publication Data

US 2015/0229031 A1 Aug. 13, 2015

(30) Foreign Application Priority Data

Sep. 20, 2012 (FR) ...................................... 12 58849

(51) Int. Cl.
*G01S 13/08* (2006.01)
*H01Q 17/00* (2006.01)

(52) U.S. Cl.
CPC ........... *H01Q 17/00* (2013.01); *H01Q 17/002* (2013.01)

(58) Field of Classification Search
CPC ............................ H01Q 17/00; H01Q 17/002
(Continued)

(56) References Cited

U.S. PATENT DOCUMENTS

| | | | |
|---|---|---|---|
| 7,826,504 | B2 | 11/2010 | Chen et al. |
| 2010/0271692 | A1 | 10/2010 | Hor et al. |

(Continued)

OTHER PUBLICATIONS

Search report for related International Application No. PCT/EP2013/069544; report dated Sep. 20, 2013.

*Primary Examiner* — Timothy A Brainard
(74) *Attorney, Agent, or Firm* — Miller, Matthias & Hull LLP

(57) ABSTRACT

The invention concerns an electromagnetic absorbent comprising: a metal earth plane, an insulating dielectric substrate, disposed on said metal earth plane, a set of metal resonant elements disposed on said insulating dielectric substrate, the electromagnetic resonant frequency of a resonant element being adjusted by adapting the dimensions of the resonant element, the set of resonant elements comprising resonant elements with different dimensions so as to enable the production, by juxtaposition of different electromagnetic resonant frequencies, of a predetermined electromagnetic absorption band. An elementary pattern formed by a plurality of metal resonant elements can be replaced periodically.

8 Claims, 4 Drawing Sheets

(58) Field of Classification Search
USPC .............................................................. 342/1
See application file for complete search history.

(56) References Cited

U.S. PATENT DOCUMENTS

| | | | | |
|---|---|---|---|---|
| 2010/0301971 | A1* | 12/2010 | Yonak ................. | H01P 1/20381 333/219.1 |
| 2011/0175672 | A1 | 7/2011 | Nguyen et al. | |

* cited by examiner

ELECTROMAGNETIC ABSORBER

CROSS-REFERENCE TO RELATED APPLICATION

This Application is a 35 USC §371 US National Stage filing of International Application No. PCT/EP2013/069544 filed on Sep. 20, 2013, and claims priority under the Paris Convention to French Patent Application No. 12 58849 filed on Sep. 20, 2012.

FIELD OF THE DISCLOSURE

The present invention concerns an electromagnetic absorbent.

BACKGROUND OF THE DISCLOSURE

The document US-2011/0175672 describes an electromagnetic absorbent comprising a set of metal elements disposed on a semiconductor substrate. An electrical command is used to modulate the conductivity of the semiconductor substrate, which makes it possible to adjust the electromagnetic absorption band of the absorbent.

One drawback of the electromagnetic absorbent described in this document is that it requires the use of an electrical command, which complicates its manufacture and use.

There therefore exists a need for an electromagnetic absorbent that is simpler to manufacture and use and which can be used on conformed surfaces without losing its properties. The present invention aims to improve the situation.

SUMMARY OF THE DISCLOSURE

To this end, the invention proposes an electromagnetic absorbent comprising:

- a metal earth plane,
- an insulating dielectric substrate, disposed on the metal earth plane,
- a set of metal resonant elements disposed on the insulating dielectric substrate, the electromagnetic resonant frequency of a resonant element being adjusted by adapting the dimensions of the resonant element, the set of resonant elements comprising resonant elements with different dimensions so as to enable the production, by juxtaposition of different electromagnetic resonant frequencies, of a predetermined electromagnetic absorption band.

Thus the electromagnetic absorbent according to the invention makes it possible to obtain a required electromagnetic absorption band passively. Consequently the electromagnetic absorbent is simpler to implement.

According to embodiments of the invention, an elementary pattern comprising several resonant elements with different dimensions is repeated periodically on the insulating dielectric substrate.

A resonant element may for example have a square, rectangular, polygonal or circular shape.

The thickness of the insulating dielectric substrate can be determined according to an electromagnetic resonant frequency of the electromagnetic absorption band provided and/or a desired absorption level.

The electromagnetic resonant frequency of a square-shaped resonant element can be adjusted by adapting the length of one side of the resonant element so that:

$$f_r = \frac{c_0}{2L'\sqrt{\mu_r \varepsilon_r}} \pm 5\%$$

where:

- $f_r$ designates the zero-order electromagnetic resonant frequency of the resonant element,
- $c_0$ designates the speed of light in a vacuum,
- $\mu_r$ designates the relative permeability of the dielectric substrate,
- $\in_r$, designates the relative permittivity of the dielectric substrate, and
- L' designates the length of one side of the resonant element.

The electromagnetic resonant frequency of a circular-shaped resonant element can be adjusted by adapting the radius of the resonant element so that:

$$f^{(0)} = \frac{z_0}{2\pi a\sqrt{\mu\varepsilon}} = \frac{z_0 \cdot c_0}{2\pi a\sqrt{\mu_r \varepsilon_r}}$$

where:

- $f^{(o)}$ designates the zero-order electromagnetic resonant frequency of the resonant element,
- a designates the radius of the resonant element,
- $c_0$ designates the speed of light in a vacuum,
- $z_0=1.841$ designates the first maximum of the Bessel function of the first kind $J_1(z)$,
- $\mu_r$ designates the relative permeability of the dielectric substrate,
- $\in_r$ designates the relative permittivity of the dielectric substrate, and
- $\mu=\mu_r\mu_0$
- $\in=\in_r\in_0$
- $\mu_0=4\pi.10^{-7}$ H/m, and
- $\in_0=8.854187\times10^{-12}$ F/m.

The electromagnetic absorbent may further comprise several stacked absorption layers, each absorption layer comprising a set of metal resonant elements.

The invention also proposes a method for manufacturing an electromagnetic absorbent comprising steps consisting of:

- disposing an insulating dielectric substrate on a metal earth plane, and
- disposing a set of metal resonant elements on the insulating dielectric substrate, the electromagnetic resonant frequency of a resonant element being adjusted by adapting the dimensions of the resonant element, the set of resonant elements comprising resonant elements with different dimensions so as to enable the production, by juxtaposition of different electromagnetic resonant frequencies, of a predetermined electromagnetic absorption band.

BRIEF DESCRIPTION OF THE DRAWINGS

Other features and advantages of the invention will also emerge from a reading of the following description. The latter is purely illustrative and must be read with regard to the accompany drawings, in which.

DETAILED DESCRIPTION OF THE DISCLOSURE

Figure 1:
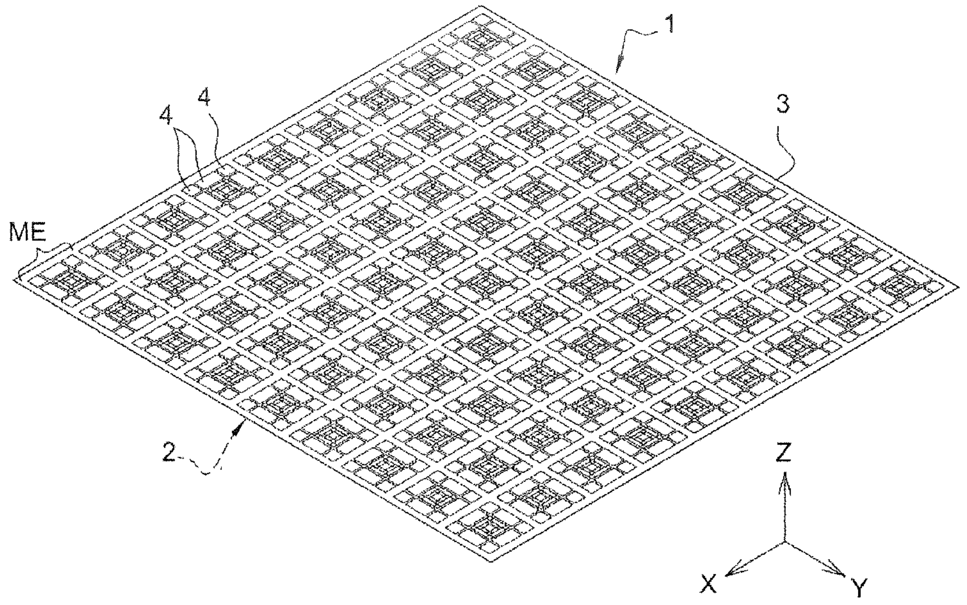
FIG. 1 is a perspective view of an electromagnetic absorbent according to one embodiment of the invention.

FIG. 1 shows an electromagnetic absorbent 1 according to an embodiment of the invention. The electromagnetic absorbent 1 has here a flat shape. In a variant, the electromagnetic absorbent 1 could have a curved shape, to enable the absorbent 1 to be integrated in a system with any curvature.

An orthogonal reference frame (0, X, Y, Z) is defined, the X and Y axes of which lie in the plane of the electromagnetic absorbent 1, and the Z axis of which is perpendicular to the plane of the absorbent 1.

Figure 2:
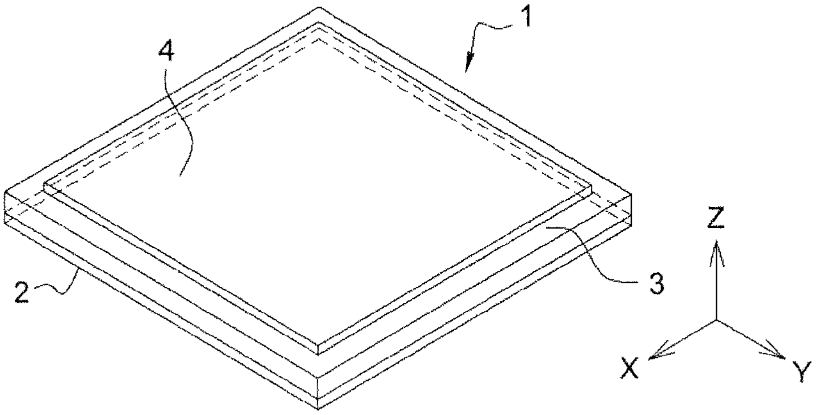
FIG. 2 is a perspective view of a portion of the electromagnetic absorbent of FIG. 1.
Figure 3:
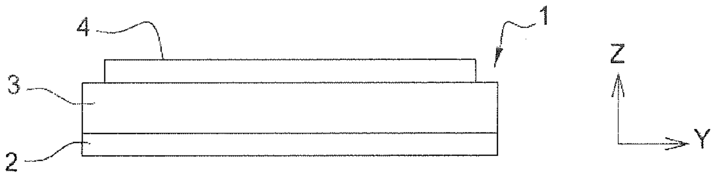
FIG. 3 is a view in cross section of the portion of electromagnetic absorbent of FIG. 2.

FIGS. 2 and 3 show a portion of the electromagnetic absorbent 1, respectively in perspective and in cross section.

The electromagnetic absorbent 1 comprises a metal earth plane 2.

The electromagnetic absorbent 1 also comprises an insulating dielectric substrate 3, disposed on the earth plane 2. The substrate 3 is for example a composite of glass fibre reinforced epoxy resin (FR4 epoxy).

The electromagnetic absorbent 1 also comprises a set of metal resonant elements 4 disposed on the dielectric substrate 3. The resonant elements 4 are for example produced from copper. Each resonant element 4 may have any shape, for example a polygonal or circular shape.

The electromagnetic absorbent 1 depicted in FIG. 1 comprises square-shaped resonant elements 4 and rectangular-shaped resonant elements 4. The portion of electromagnetic absorbent 1 depicted in FIGS. 2 and 3 comprises a single square-shaped resonant element 4.

The resonant frequency of a resonant element 4 depends in particular on the dimensions of the resonant element 4 and the thickness of the dielectric substrate 3. The absorption level depends in particular on the thickness of the dielectric substrate 3 and the periodicity of the set of resonant elements 4.

For example, in the case of a square-shaped resonant element 4, the electromagnetic resonant frequency of the resonant element 4 may be adjusted by adapting the length L' of one side of the resonant element 4 so that:

$$f_r = \frac{c_0}{2L'\sqrt{\mu_r \varepsilon_r}} \pm 5\%$$

where:

$f_r$ designates the zero-order electromagnetic resonant frequency of the resonant element 4, $c_0$ designates the speed of light in a vacuum, $\mu_r$ designates the relative permeability of the dielectric substrate, $\in_r$ designates the relative permittivity of the dielectric substrate 3, and L' designates the length of one side of the resonant element 4.

The above equation makes it possible to obtain an adjustment of the electromagnetic resonant frequency to within a few percent.

A more precise adjustment of the electromagnetic resonant frequency of the resonant element 4 can be obtained by considered that the length L' is an approximation of the length of one side of the resonant element 4 and by adapting the length L of one side of the resonant element 4 so that:

$$L' = L + 2\Delta L$$

which gives:

$$L = \frac{c_0}{2f_r\sqrt{\mu_r \varepsilon_r}} - 2\Delta L$$

with:

$$\frac{\Delta L}{h} = 0.412\frac{(\varepsilon_{reff} + 0.3)\left(\frac{W}{h} + 0.264\right)}{(\varepsilon_{reff} - 0.258)\left(\frac{W}{h} + 0.8\right)}$$

where:

W designates the width of the resonant element 4, that is to say, in the case of a square-shaped resonant element, W=L', and h designates the thickness of the dielectric substrate 3, and where:

$$\varepsilon_{reff} = \frac{\varepsilon_r + 1}{2} + \frac{\varepsilon_r - 1}{2}\left(1 + 12\frac{h}{W}\right)^{-1/2}$$

Figure 4:
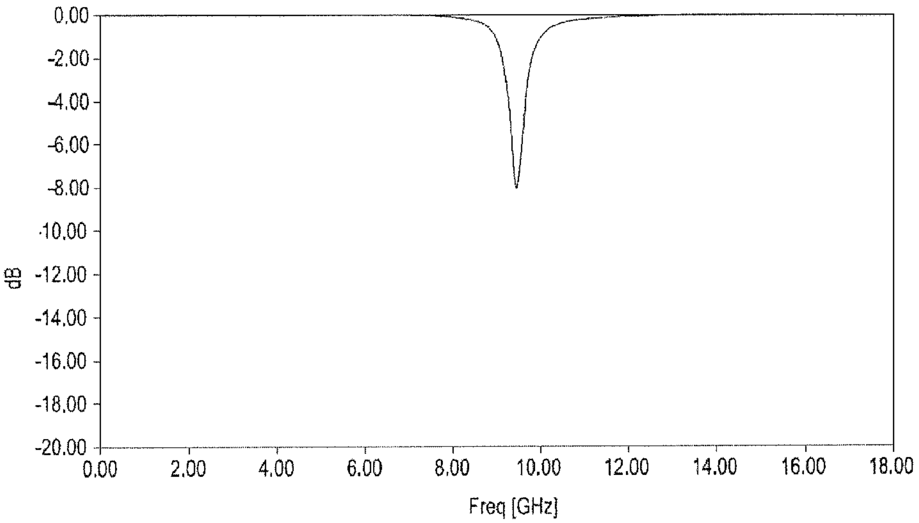
FIG. 4 is a graph showing the coefficient of reflection of an incident electromagnetic wave on the portion of electromagnetic absorption of FIGS. 2 and 3 according to the frequency of the incident electromagnetic wave.

FIG. 4 shows a curve representing the calculated coefficient of reflection of an incident electromagnetic wave on an infinite array of square resonant elements 4 as a function of the frequency of the incident electromagnetic wave.

Each resonant element 4 has here a square shape with sides of 7 mm. The array is therefore periodic and formed by a set of identical resonant elements 4 with a period of 8 mm in the directions of the plane X and Y. The substrate 3 is an FR4 epoxy substrate 0.3 mm thick. An incident electromagnetic wave propagating in the Z direction is considered.

It is observed in FIG. 4 that the portion of electromagnetic absorbent 1 has a reflection of less than 100% and therefore an absorption, around the frequency 9.45

GHz, which corresponds to the resonant frequency of the resonant element 4. The absorption is effected by a plasmon resonance effect of the resonant element 4 at its resonant frequency.

In the case of a circular-shaped resonant element 4, the electromagnetic resonant frequency can be adjusted by adapting the radius of the resonant element 4 so that:

$$f^{(0)} = \frac{z_0}{2\pi a\sqrt{\mu\varepsilon}} = \frac{z_0 \cdot c_0}{2\pi a\sqrt{\mu_r\varepsilon_r}}$$

where:

$f^{(0)}$ designates the zero-order electromagnetic resonant frequency of the resonant element, a designates the radius of the resonant element 4, $c_0$ designates the speed of light in a vacuum, $z_0=1.841$ designates the first maximum of the Bessel function of the first kind $J_1(z)$, $\mu_r$ designates the relative permeability of the dielectric substrate, $\in_r$ designates the relative permittivity of the dielectric substrate, and $\mu=\mu_r\mu_0$ $\in=\in_r\in_0$ $\mu_0=4\pi.10^{-7}$ H/m, and $\in_0=8.854187\times10^{-12}$ F/m.

As depicted in FIG. 1, the set of resonant elements 4 of the absorbent 1 comprises resonant elements 4 with different dimensions and/or shapes. The juxtaposition of the electromagnetic resonant frequencies of the various resonant elements 4 thus makes it possible to obtain one or more electromagnetic absorption bands.

Several resonant elements 4 with different dimensions and/or shapes can be arranged on the substrate 3 so as to form an elementary pattern ME covering the predetermined electromagnetic absorption band or bands.

Figure 5:
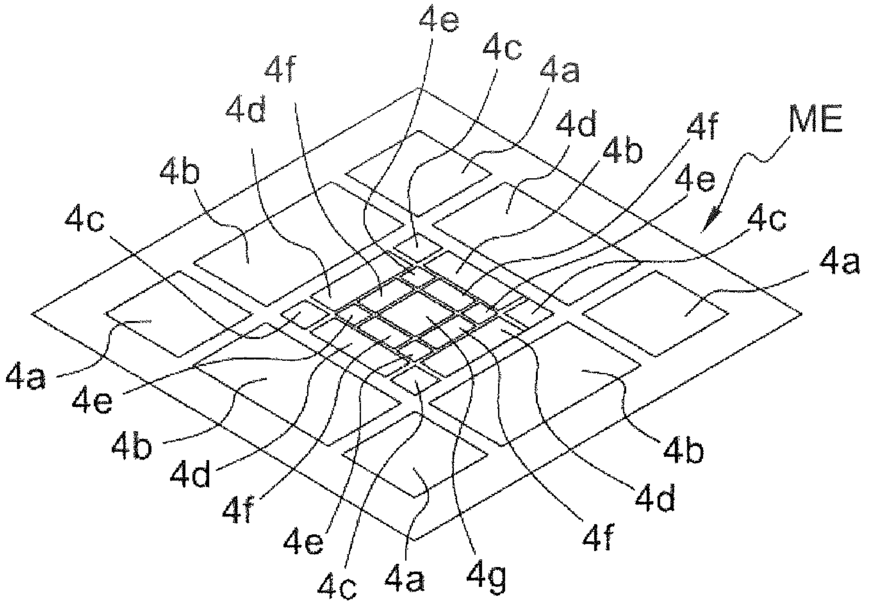
FIG. 5 is an enlarged view of an elementary pattern of the electromagnetic absorbent of FIG. 1.

FIG. 5 shows an enlargement of the elementary pattern ME of FIG. 1. This elementary pattern ME comprises four square-shaped resonant elements 4*a* having sides with a length of $L_a$, four rectangular-shaped resonant elements 4*b* having a length $L_b$ and a width $I_b$, four square-shaped resonant elements 4*c* having sides with length of $L_c$, four rectangular-shaped resonant elements 4*d* having a length $L_d$ and a width $I_d$, four square-shaped resonant elements 4*e* having sides with a length of $L_e$, four rectangular-shaped resonant elements 4*f* having a length $L_f$ and a width $I_f$ and a square-shaped central resonant element 4*g* having a sides with the length of $L_g$.

The elementary pattern ME can then be repeated periodically over the entire surface of the insulating dielectric substrate 3, or over part of the surface of the insulating dielectric substrate 3. The number of periodic repetitions depends on the surface on which it is desired to effect an absorption.

Figure 6:
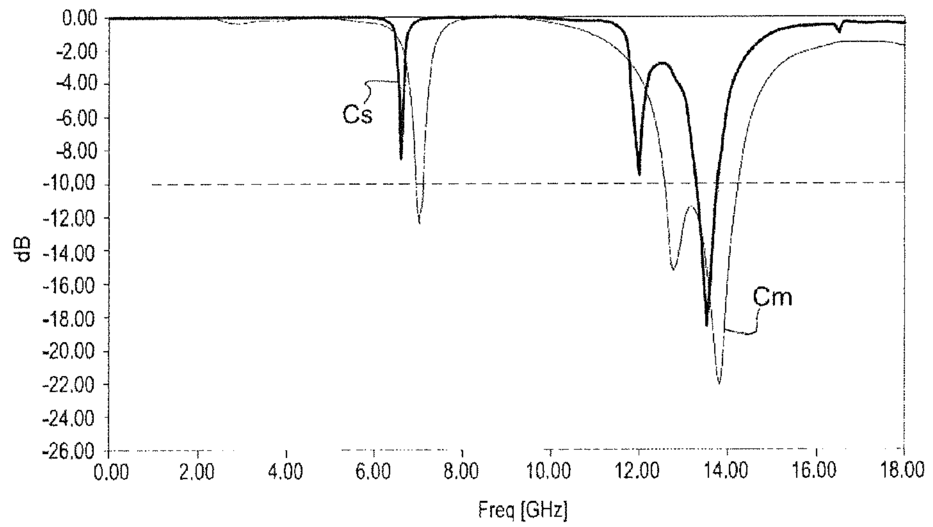
FIG. 6 is a graph showing the coefficient of reflection of an incident magnetic wave on the electromagnetic absorption of FIG. 1 as a function of the frequency of the incident electromagnetic wave.

FIG. 6 shows a graph depicting the coefficient of reflection of an incident electromagnetic wave on the electromagnetic absorption 1 of FIG. 1 as a function of the frequency of the incident electromagnetic wave.

The curve Cs is obtained by a simulation and the curve Cm by a measurement. A minimum absorption threshold fixed a −10 dB is considered. Thus, in FIG. 6, a first absorption band is observed around the frequency 7 GHz, and a second absorption band in a frequency range from 12.5 to 14.3 GHz.

The electromagnetic absorption 1 with passive metamaterial described above has the advantage of being light, thin and conformable. It affords identical functioning independent of the polarisation over a large frequency band and a wide range of angles of incidence.

The electromagnetic absorbent 1 also has a very low thickness compared with the wavelength λ for which it is calibrated. It is thus possible to implement an absorption band with a simple structure with an approximate thickness λ/45. For example, the thickness of the absorbent 1 is approximately 0.5 mm for a wavelength of 2.24 cm.

As this thickness is very small it is possible to increase the absorption by using stacks of identical layers of reduced thickness compared with the wavelength. In other words, the absorbent 1 then comprises several stacked absorption layers, each absorption layer comprising a set of metal resonant elements 4.

Figure 7:
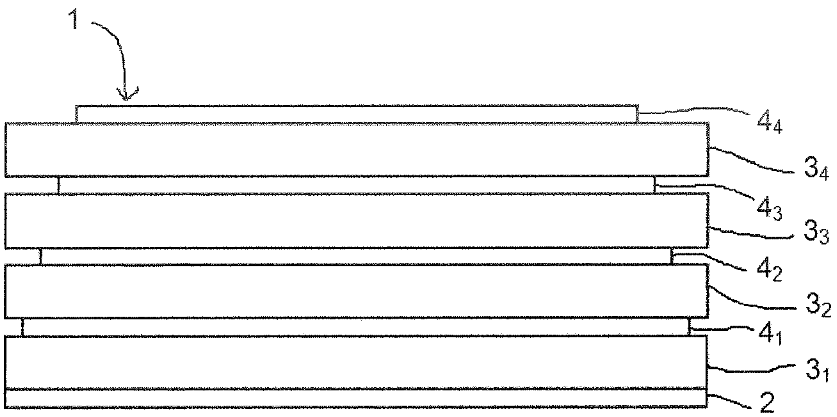
FIG. 7 is a view in cross section of an electromagnetic absorbent according to another embodiment in which the electromagnetic absorbent comprises several stacked absorption layers.

FIG. 7 shows an example embodiment of an absorbent 1 comprising four stacked absorption layers. The electromagnetic absorbent 1 here comprises an earth plane 2 on which a first insulating dielectric substrate $\mathbf{3}_1$ is disposed. A first set of metal resonant elements $\mathbf{4}_1$ is disposed on the first dielectric substrate $\mathbf{3}_1$. A second dielectric substrate $\mathbf{3}_2$ is disposed on the first set of resonant elements $\mathbf{4}_1$. A second set of metal resonant elements $\mathbf{4}_2$ is disposed on the second dielectric substrate $\mathbf{3}_2$. A third dielectric substrate $\mathbf{3}_3$ is disposed on the second set of resonant elements $\mathbf{4}_2$. A third set of metal resonant elements $\mathbf{4}_3$ is disposed on the third dielectric substrate $\mathbf{3}_3$. A fourth dielectric substrate $\mathbf{3}_4$ is disposed on the third set of resonance elements $\mathbf{4}_3$. A fourth set of metal resonant elements $\mathbf{4}_4$ is disposed on the fourth dielectric substrate $\mathbf{3}_4$.

The number of stacked absorption layers depends on the required absorption and is not limitative.

In addition, the small thickness of the absorbent 1 makes it possible to produce a conformable absorbent 1 on surfaces of revolution with a small radius of curvature.

The electromagnetic absorbent 1 can mainly be used in the field of electromagnetic compatibility.

Figure 8:
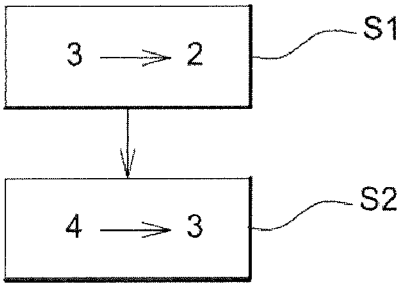
FIG. 8 is a flow diagram illustrating the steps of a method for manufacturing an electromagnetic absorbent according to an embodiment of the invention.

Referring to FIG. 8, the steps of a method for manufacturing an electromagnetic absorbent 1 according to an embodiment of the invention is described.

At step S1, an insulating dielectric substrate 3 is disposed on a metal earth plane 2. The substrate 3 is for example a glass fibre reinforced epoxy resin composite (FR4 epoxy).

At step S2, a set of metal resonant elements 4 is disposed on the insulating dielectric substrate 3. As described above, the dimensions of the resonant elements 4 are adapted according to one or more required electromagnetic absorption bands.

This method in particular simplifies the manufacture of the absorbent, and therefore reduces its manufacturing cost.

Naturally the present invention is not limited to the embodiments described above by way of examples; it extends to other variants.

The invention claimed is:

1. An electromagnetic absorbent comprising:

a metal earth plane, an insulating dielectric substrate, disposed on said metal earth plane, a set of metal resonant elements disposed on said insulating dielectric substrate, the electromagnetic resonant frequency of a resonant element being adjusted by adapting the dimensions of the said resonant element, the set of resonant elements comprising resonant elements with different dimensions so as to enable the production, by juxtaposition of different electromagnetic resonant frequencies, of a predetermined electromagnetic absorption band.

2. The electromagnetic absorbent according to claim 1, in which an elementary pattern comprising several resonant elements with different dimensions is repeated periodically on the insulating dielectric substrate.

3. The electromagnetic absorbent according to claim 1, in which the said resonant element has a square, rectangular, polygonal or circular shape.

4. The electromagnetic absorbent according to claim 1, in which the insulating dielectric substrate has a thickness determined according to an electromagnetic resonant frequency of the predetermined electromagnetic absorption band and/or a desired absorption level.

5. The electromagnetic absorbent according to claim 1, in which the electromagnetic resonant frequency of a square-shaped resonant element is adjusted by adapting the length of one side of the resonant element so that:

$$f_r = \frac{c_0}{2L'\sqrt{\mu_r \varepsilon_r}} \pm 5\%$$

where:

$f_r$ designates the zero-order electromagnetic resonant frequency of the resonant element, $c_0$ designates the speed of light in a vacuum, $\mu_r$ designates the relative permeability of the dielectric substrate, $\in_r$ designates the permittivity of the dielectric substrate, and L' designates the length of one side of the resonant element.

6. The electromagnetic element according to the claim 1, in which the electromagnetic resonant frequency of a circular-shaped resonant element can be adjusted by adapting the radius of the resonant element so that:

$$f^{(0)} = \frac{z_0}{2\pi a\sqrt{\mu\varepsilon}}$$

-continued $$= \frac{z_0 \cdot c_0}{2\pi a\sqrt{\mu_r \varepsilon_r}}$$

where:

$f^{(0)}$ designates the zero-order electromagnetic resonant frequency of the resonant element, a designates the radius of the resonant element, $c_0$ designates the speed of light in a vacuum, $z_0$=1.841 designates the first maximum of the Bessel function of the first kind $J_1(z)$, $\mu_r$ designates the relative permeability of the dielectric substrate, $\in_r$ designates the permittivity of the dielectric substrate, $\mu=\mu_r\mu_0$ $\in=\in_r\in_0$ $\mu_0=4\pi.10^{-7}$ H/m, and $\in_0=8.854187\times10^{-12}$ F/m.

7. The electromagnetic absorbent according to claim 1, comprising several stacked absorption layers, each absorption layer comprising a set of metal resonant elements.

8. A method for manufacturing an electromagnetic absorbent, comprising steps consisting of:

disposing an insulating dielectric substrate on a metal earth plane, and disposing a set of metal resonant elements on the insulating dielectric substrate the electromagnetic resonant frequency of a resonant element being adjusted by adapting the dimensions of the said resonant element, the set of resonant elements comprising resonant elements with different dimensions so as to enable the production, by juxtaposition of different electromagnetic resonant frequencies, of a predetermined electromagnetic absorption band.

* * * * *